No. 873,272. PATENTED DEC. 10, 1907.
C. SHELEY.
SKID.
APPLICATION FILED MAY 31, 1907.
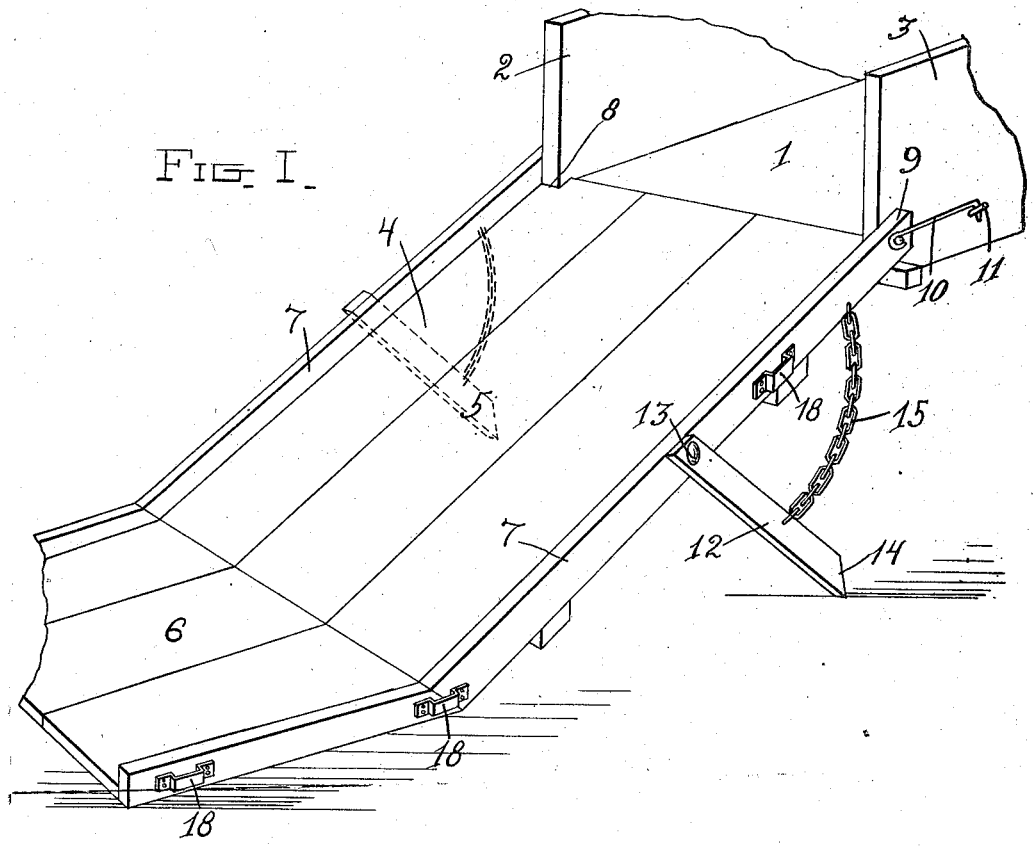
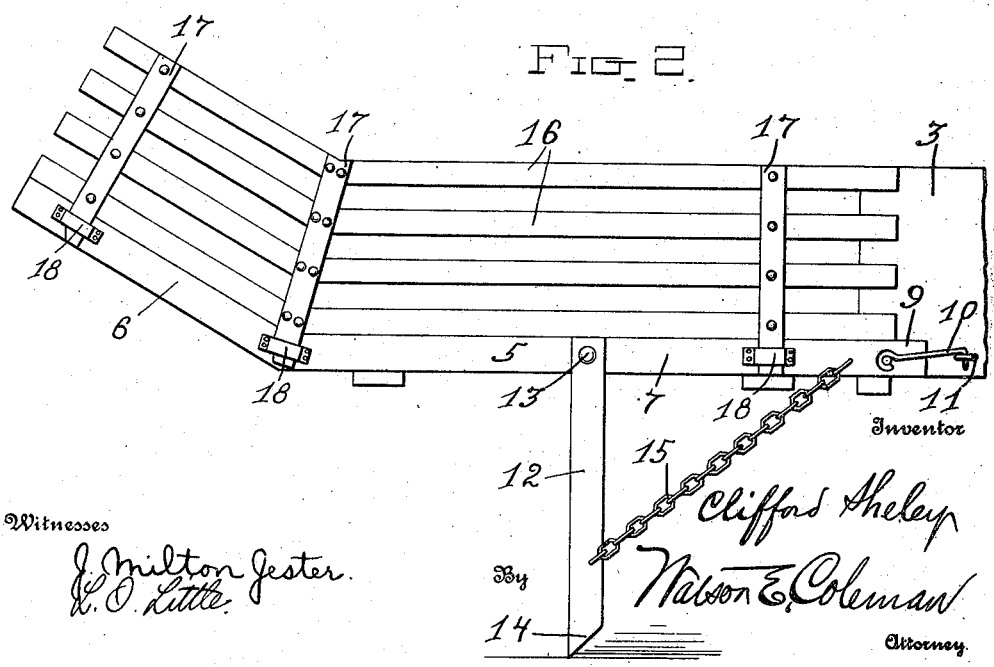
Witnesses
J. Milton Jester.
L. O. Little.
Inventor
Clifford Sheley
By Nelson E. Coleman
Attorney.

UNITED STATES PATENT OFFICE.

CLIFFORD SHELEY, OF NORTON, KANSAS.

SKID.

No. 873,272.

Specification of Letters Patent.

Patented Dec. 10, 1907.

Application filed May 31, 1907. Serial No. 376,545.

*To all whom it may concern:*

Be it known that I, CLIFFORD SHELEY, a citizen of the United States, residing at Norton, in the county of Norton and State of Kansas, have invented certain new and useful Improvements in Skids, of which the following is a specification, reference being had therein to the accompanying drawing.

My invention relates to improvements in skids or devices for loading barrels, boxes, etc., upon wagons or the like.

The object of the invention is to provide a device of this character which may be readily attached to a wagon or other vehicle and which is so constructed that when the wagon is moved forwardly it will be elevated to the level of the floor of the wagon in order that the barrel or box upon it may be readily moved into the wagon.

With the above and other objects in view the invention consists in the novel construction and the combination and arrangement of parts hereinafter described and claimed, and illustrated in the accompanying drawings, in which Figure 1 is a perspective view of the rear end of a wagon, showing the application of my improved skid thereto, the skid being in its lowered position; and Fig. 2 is a side elevation of the same, showing the skid in its raised or elevated position and also showing it provided with removable sides.

In the drawings, 1 denotes the rear end of the body of a wagon or other vehicle having a bottom 2 and sides 3, and 4 denotes my improved skid. The latter comprises a body preferably of angular form, that is, it has a comparatively long forward portion 5 and a shorter rear portion 6. It may be constructed in any suitable manner but as shown it is composed of a plurality of longitudinal boards connected by cross boards or bars and at its side edges are arranged upwardly extending side bars 7. The length of the portion 5 and its angle with respect to the portion 6 are such that when the latter is horizontal and resting upon the ground, the upper end of the portion 5 will be disposed at the level of the bottom of the wagon or other vehicle in connection with which the device is to be used. Any suitable means may be provided for attaching the skid to the wagon but as shown the upper end of the portion 5 is notched or recessed, as at 8, to receive the sides 3 of the wagon and the upper ends of the side bars 7 are extended, as shown at 9, and provided with pivoted hooks 10 which are adapted to engage eyes 11 arranged upon the outer faces of the sides 3.

The foregoing construction provides a simple means for connecting the skid to the wagon so that when the latter is moved forwardly the skid will be carried with it, but any other means of attachment may be employed.

In order to raise the rear end of the skid to the level of the floor of the wagon as the latter is moved forwardly, I provide two legs 12 which serve as hoisting levers. These legs are pivoted at their upper ends, as at 13, upon the side bars 7 and their opposite ends are pointed or tapered, as at 14, so as to dig into the ground and prevent them from slipping. Any suitable means may be provided for preventing the legs from swinging beyond the vertical after they have been moved to the position shown in Fig. 2 by the forward movement of the wagon, but I preferably provide chains 15 or other flexible connections between the lower portions of the legs and the side bars 7. If desired the skid may be provided with removable sides 16, as shown in Fig. 2. These sides may be frames of any suitable construction provided at their bottoms with depending projections or stakes 17 to removably engage sockets 18 arranged upon the side bars 7. These sides 16 are only employed when it is desired to load small animals or live stock upon the wagon.

The use of the invention will be readily understood upon reference to Figs. 1 and 2 of the drawings. When it is desired to hoist a load upon the wagon the skid is applied to its rear end, as shown in Fig. 1, and the barrel, box, or the like is placed upon the horizontal portion 6 of the skid. The wagon is then moved by the animal or team forwardly so that the pointed ends of the legs 12 will dig into the ground and serve as fulcrums for said legs, which latter as they swing to their vertical position shown in Fig. 2, will hoist the rear end of the skid and the load thereon to the level of the floor of the wagon.

Having thus described my invention what I claim and desire to secure by Letters Patent is:—

The combination with a vehicle body having a bottom and upright sides, of a skid having an angular body consisting of a bottom and side bars upon the longitudinal edges of said bottom, said skid body being adapted to project into the vehicle body and rest upon the bottom of the same, the upper corners of the bottom of the skid being formed with notches to receive the upright sides of the vehicle body, the side bars upon the skid body having their upper ends extended beyond said notches to engage the outer faces of the sides of the vehicle body, detachable fastenings connecting said side bars of the skid body to the vehicle body, legs pivoted to the skid and adapted to engage the ground and flexible connections between said legs and the skid body, substantially as described.

In testimony whereof I hereunto affix my signature in presence of two witnesses.

CLIFFORD SHELEY.

Witnesses:
   J. R. STRICKLAND,
   D. O. GARRISON.